L. G. WEAVER.
COURSE INDICATOR.
APPLICATION FILED APR. 9, 1919.
1,348,191.
Patented Aug. 3, 1920.
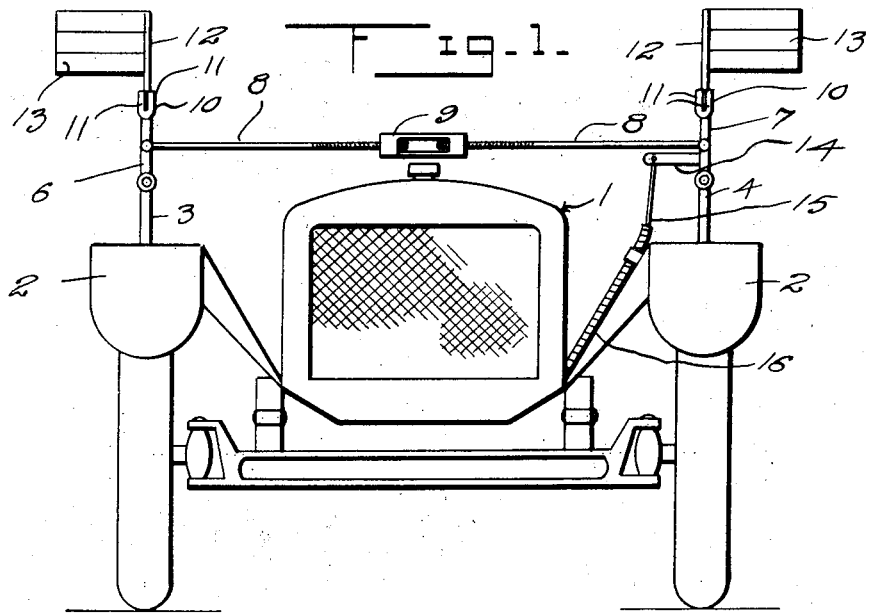
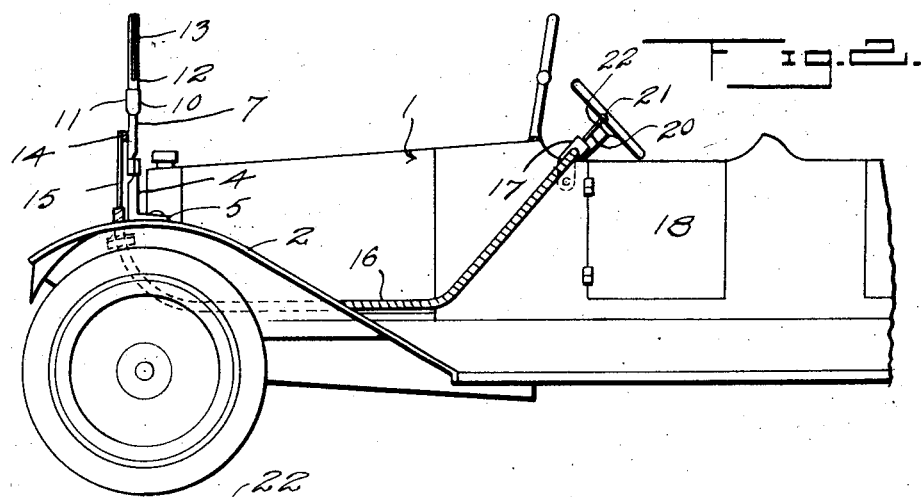
Inventor
L. G. Weaver.
By
Atty.

UNITED STATES PATENT OFFICE.

LENNOX G. WEAVER, OF PORTLAND, OREGON.

COURSE-INDICATOR.

1,348,191. Specification of Letters Patent. Patented Aug. 3, 1920.

Application filed April 9, 1919. Serial No. 288,767.

*To all whom it may concern:*

Be it known that I, LENNOX G. WEAVER, a citizen of the United States, residing at Portland, in the county of Multnomah and State of Oregon, have invented certain new and useful Improvements in Course-Indicators; and I do hereby declare the following to be a full, clear, and exact description of the invention, such as will enable others skilled in the art to which it appertains to make and use the same.

This invention relates to improvements in automobile course indicators and has for one of its objects the provision of pivotally mounted means carrying signals or display matter of any form adapted to normally maintain vertical positions and which can be swung to the left or right of the automobile at the will of the operator to indicate the course of the respective automobile, thereby obviating the practice of placing the hand laterally of the automobile to indicate that a turn is to be made.

Another object of this invention is the provision of means for operating the signals by the use of one hand of the operator and which means will retain the signals in the desired position, permitting the operator to employ both hands in driving the automobile on a curve or at any other time where it is essential that careful control or manipulation of the automobile is required to obviate accidents.

A further object of this invention is the provision of a course indicator of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which:—

Figure 1 is a front elevation of an automobile illustrating the course indicator applied thereto and constructed in accordance with my invention, Fig. 2 is a fragmentary side elevation partly in section of the automobile illustrating clearly the mounting of the controlling means for the signals, Fig. 3 is a vertical sectional view of the controlling means, and Fig. 4 is an enlarged detail sectional view of the bushing illustrating the locking fingers.

Referring in detail to the drawing, the numeral 1 indicates the body of an automobile having the usual front mud guards or fenders 2, to which my invention is adapted to be applied. Vertically disposed brackets 3 and 4 have formed upon their lower ends feet 5 which are curved to conform to the contour of the mud guards or fenders 2 of the automobile 1 and are secured thereto by suitable fasteners. The brackets 3 and 4 have hinged to their upper ends supporting members 6 and 7. The hinged connections between the brackets and the supporting members are of such a nature that the supporting members may be swung laterally of the automobile 1 in either direction. The supporting members have pivoted thereto rods 8 which are adjustably connected by a turn buckle 9 so that the supporting members can be adjusted toward and from each other and will compel them to move in unison. The upper ends of the supporting members 6 and 7 are enlarged to form cups 10 that are bifurcated or slotted to form gripping fingers 11. The cups 10 are adapted to receive stems 12 which are held within the cups by the gripping action of the fingers 11. The stems 12 are adapted to have secured to their upper ends flags or other signaling members 13.

The signaling members or flags 13 are constructed of rigid material and project laterally from the stems so that they can be readily observed by traffic in the vicinity of the respective automobiles. A right angled arm 14 is formed upon the supporting member 7 and is adapted to have connected thereto a flexible member 15 which extends through a flexible casing or housing 16. The flexible casing or housing 16 has one end secured to the mud guard or fender adjacent the arm 14 and has its other end under control of the operator and passing through a bushing 17 which is mounted on the body 18 of the automobile 1. Inwardly directed resilient fingers 19 are formed within one end of the bushing 17 and have their ends relatively spaced and in circular formation to receive a rod 20 secured to the free end of the flexible element 15. The rod 20 extends outwardly of the bushing and is equipped with a handle or finger grip 21. The rod 20 is provided with spaced notches or grooves 22, three in number, the intermediate notch when engaged by the fingers of the bushing holds the signaling members in vertical position, and by moving the rod so that the fingers engage the outermost notch, the signaling members will be swung laterally of the automobile in one direction to indicate that a turn is to be made in said direction, and by moving the rod so that the innermost groove or notch is engaged by the fingers of the bushing, the signaling fingers 13 are swung laterally of the automobile in an opposite direction indicating that a turn is to be made in the last named direction. It will be noted that by moving the signaling members into either of their signaling or non-signaling positions, they will be held in said position by the fingers of the bushing engaging in the respective notches of the rod 20 but will permit movement of the rod when undue pressure is placed upon the finger grip. By having the signaling members lockable in any of their positions, permits the operator to use both of his hands in controlling the automobile after once actuating the signals thereby obviating numerous accidents caused by operators not having the use of both hands in controlling or manipulating an automobile in congested or dangerous localities.

While I have shown and described the preferred embodiment of my invention, it will be understood that minor changes in construction, combination, and arrangement of parts may be made without departing from the spirit and scope of the invention as claimed.

Having thus described my invention, what I claim is:—

A course indicator comprising supporting brackets secured to an automobile, supporting members hinged to the brackets, means connecting the supporting members so as to cause them to move in unison, cups formed upon the upper ends of the supporting members and bifurcated to form gripping fingers, stems located within said cups and held therein by the fingers, signaling members secured to the stems, and means connected to one of the supporting members for causing said supporting members to move laterally of the automobile in either direction.

In testimony whereof I affix my signature in presence of two witnesses.

LENNOX G. WEAVER.

Witnesses:
 COE A. McKENNA,
 J. A. CLARK.